(12) United States Patent
Park et al.

(10) Patent No.: US 8,675,750 B2
(45) Date of Patent: Mar. 18, 2014

(54) APPARATUS AND METHOD FOR REDUCING PEAK TO AVERAGE POWER RATIO THROUGH RECOMBINATION OF ORTHOGONAL FREQUENCY DIVISION MULTIPLEXING SYMBOL

(75) Inventors: Joun Sup Park, Gyunggi-do (KR); Chul Gyun Park, Gyunggi-do (KR); Young Chai Ko, Seoul (KR); Seung Sik Eum, Seoul (KR)

(73) Assignees: Samsung Electro-Mechanics Co., Ltd., Suwon (KR); Korea University Industrial & Academic Collaboration Foundation, Seoul (KR)

( * ) Notice: Subject to any disclaimer, the term of this patent is extended or adjusted under 35 U.S.C. 154(b) by 164 days.

(21) Appl. No.: 13/165,569

(22) Filed: Jun. 21, 2011

(65) Prior Publication Data

US 2012/0201314 A1 Aug. 9, 2012

(30) Foreign Application Priority Data

Feb. 9, 2011 (KR) .................. 10-2011-0011552

(51) Int. Cl.
*H04L 27/28* (2006.01)

(52) U.S. Cl.
USPC ........... 375/260; 375/259; 375/295; 375/303; 455/59

(58) Field of Classification Search
USPC .............. 375/260, 259, 295, 303; 455/59
See application file for complete search history.

(56) References Cited

U.S. PATENT DOCUMENTS

| | | | |
|---|---|---|---|
| 7,301,891 B2 | 11/2007 | Park et al. | |
| 2004/0174232 A1* | 9/2004 | Rosnell | 333/138 |
| 2005/0286648 A1 | 12/2005 | Feng et al. | |
| 2009/0097579 A1* | 4/2009 | Yeon et al. | 375/260 |

FOREIGN PATENT DOCUMENTS

KR 10-0666689 1/2007

* cited by examiner

*Primary Examiner* — Leila Malek
(74) *Attorney, Agent, or Firm* — McDermott Will & Emery LLP

(57) ABSTRACT

There are provided an apparatus and a method for reducing a peak to average power ratio (PAPR) through the recombination of an orthogonal frequency division multiplexing (OFDM) symbol. The apparatus includes an orthogonal frequency division multiplexing (OFDM) symbol transforming unit, a peak power measuring unit, and an OFDM symbol selecting unit, wherein the OFDM symbol transforming unit generates the plurality of OFDM symbols by (a) performing a process of rotating the OFDM symbol by a predetermined angle in a complex plane and performing cyclical shifting with respect to the rotated OFDM symbol and (b) repetitively performing process (a) with respect to the cyclically shifted OFDM symbol. Therefore, diversity is secured, whereby the PAPR may be reduced.

8 Claims, 3 Drawing Sheets

APPARATUS AND METHOD FOR REDUCING PEAK TO AVERAGE POWER RATIO THROUGH RECOMBINATION OF ORTHOGONAL FREQUENCY DIVISION MULTIPLEXING SYMBOL

CROSS-REFERENCE TO RELATED APPLICATIONS

This application claims the priority of Korean Patent Application No. 10-2011-0011552 filed on Feb. 9, 2011, in the Korean Intellectual Property Office, the disclosure of which is incorporated herein by reference.

BACKGROUND OF THE INVENTION

1. Field of the Invention

The present invention relates to an apparatus and a method for reducing a peak to average power ratio (PAPR) by securing diversity an orthogonal frequency division multiplexing (OFDM) symbol.

2. Description of the Related Art

Generally, an orthogonal frequency division multiplexing (OFDM) communication scheme may efficiently use frequency resources, as compared to a single carrier scheme, and may easily remove intersymbol interference in a frequency selective multipath fading channel, such that the OFDM communication scheme may be used in many communications standards.

However, in the OFDM communication scheme, the possibility of the occasional generation of a high peak power due to an irregular interference phenomenon between several subcarriers exists. This high peak power may be represented by a peak to average power ratio (PAPR). Here, the PAPR indicates a ratio of a peak power to an average power of an OFDM symbol. A high PAPR allows a power amplifier of a transmitter to be out of a dynamic range, which may distort both an in-band signal and an out-of-band signal. Therefore, there is a need to reduce the PAPR.

SUMMARY OF THE INVENTION

An aspect of the present invention is to provide an apparatus and a method for reducing a peak to average power ratio (PAPR) capable of reducing the PAPR by securing diversity in an orthogonal frequency division multiplexing (OFDM) symbol.

According to an aspect of the present invention, there is provided an apparatus for reducing a peak to average power ratio (PAPR), the apparatus including: an orthogonal frequency division multiplexing (OFDM) symbol transforming unit sequentially transforming an OFDM symbol in a time domain obtained through an inverse fast Fourier transform (IFFT) to generate a plurality of OFDM symbols; a peak power measuring unit measuring peak powers of each of the OFDM symbol and the plurality of OFDM symbols generated therefrom; and an OFDM symbol selecting unit selecting an OFDM symbol having a minimum value among the measured peak powers as a candidate OFDM symbol to be transmitted and transmitting the selected candidate OFDM symbol, wherein the OFDM symbol transforming unit generates the plurality of OFDM symbols by (a) performing a process of rotating the OFDM symbol by a predetermined angle in a complex plane and performing cyclical shifting with respect to the rotated OFDM symbol and (b) repetitively performing process (a) with respect to the cyclically shifted OFDM symbol.

The OFDM symbol transforming unit may perform the cyclic shifting by cyclically shifting a quadrature phase (Q) component of the rotated OFDM symbol and recombinating the cyclically shifted quadrature phase (Q) component with an existing in-phase (I) component.

The OFDM symbol transforming unit may perform the cyclic shifting by cyclically shifting an in-phase phase (I) component of the rotated OFDM symbol and recombinating the cyclically shifted in-phase (I) component with an existing quadrature phase (Q) component.

The predetermined angle may be 45 degrees, wherein the OFDM symbol transforming unit uses only an addition operation and a subtraction operation of the in-phase (I) component and the quadrature phase (Q) component of the OFDM symbol in calculating a result by the rotation of the OFDM symbol.

According to another aspect of the present invention, there is provided a method for reducing a peak to average power ratio (PAPR), the method including: (a) sequentially transforming an OFDM symbol in a time domain obtained through an inverse fast Fourier transform (IFFT) to generate a plurality of OFDM symbols; (b) measuring peak powers of each of the OFDM symbol and the plurality of OFDM symbols generated therefrom; and (c) selecting an OFDM symbol having a minimum value among the measured peak powers as a candidate OFDM symbol to be transmitted and transmitting the selected candidate OFDM symbol, wherein in step (a), the plurality of OFDM symbols are generated by (a1) performing a process of rotating the OFDM symbol by a predetermined angle in a complex plane and performing cyclical shifting with respect to the rotated OFDM symbol; and (a2) repetitively performing step (a1) with respect to the cyclically shifted OFDM symbol.

In step (a), the cyclic shifting may be performed by cyclically shifting a quadrature phase (Q) component of the rotated OFDM symbol and recombinating the cyclically shifted quadrature phase (Q) component with an existing in-phase (I) component.

In step (a), the cyclic shifting may be performed by cyclically shifting an in-phase phase (I) component of the rotated OFDM symbol and recombinating the cyclically shifted in-phase (I) component with an existing quadrature phase (Q) component.

In step (a), the predetermined angle may be 45 degrees, wherein only an addition operation and a subtraction operation of the in-phase (I) component and the quadrature phase (Q) component of the OFDM symbol are used in calculating a result by the rotation of the OFDM symbol.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
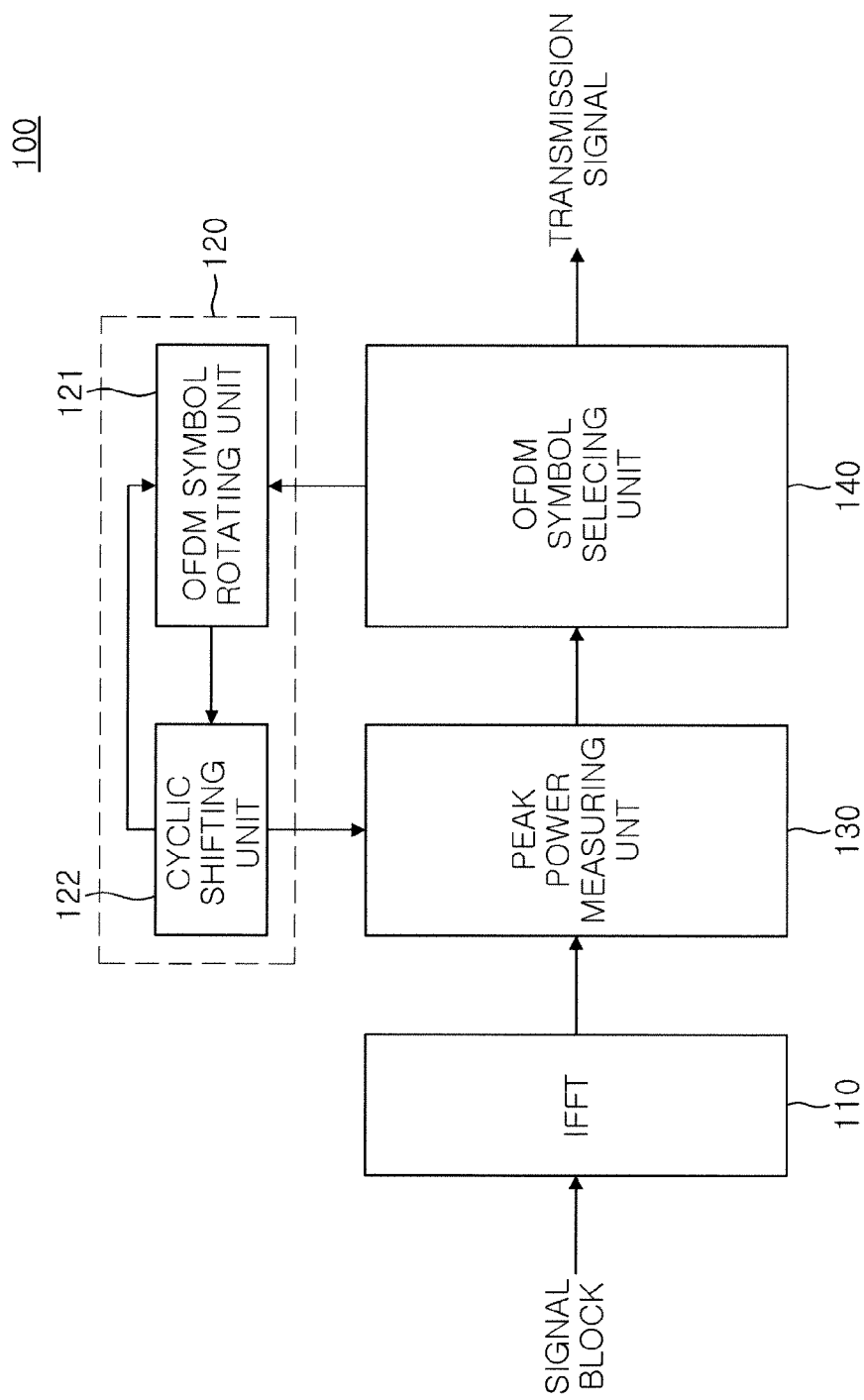
FIG. 1 is a diagram showing an apparatus for reducing a peak to average power ratio (PAPR) through recombination of an orthogonal frequency division multiplexing (OFDM) symbol according to an exemplary embodiment of the present invention.

Exemplary embodiments of the present invention will be described with reference to the accompanying drawings. The exemplary embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. Therefore, it is to be noted that the shape and size of components shown in the drawings may be exaggerated in the interests of clarity of description.

FIG. 1 is a diagram showing an apparatus for reducing a peak to average power ratio (PAPR) through recombination of an orthogonal frequency division multiplexing (OFDM) symbol according to an exemplary embodiment of the present invention. An apparatus 100 for reducing a PAPR according to an exemplary embodiment of the present invention may include an inverse fast Fourier transformer 110, an OFDM symbol transforming unit 120 sequentially transforming an OFDM symbol in a time domain obtained through the inverse fast Fourier transformer 110 to generate a plurality of OFDM symbols, a peak power measuring unit 130 measuring peak powers of each of the OFDM symbol and the plurality of OFDM symbols generated therefrom, and an OFDM symbol selecting unit 140 selecting an OFDM symbol having a minimum value among the measured peak powers as a candidate OFDM symbol to be transmitted and transmitting the selected candidate OFDM symbol, as shown in FIG. 1. Particularly, the present invention is implemented in the same manner as a general OFDM symbol transmitting method with the exception of the OFDM symbol transforming unit 120 and the OFDM symbol selecting unit 140.

Hereinafter, an apparatus for reducing a PAPR through the recombination of an OFDM symbol according to an exemplary embodiment of the present invention will be described in detail with reference to FIG. 1.

Referring to FIG. 1, the inverse fast Fourier transformer (IFFT) 110 transforms a signal block in a frequency domain to an OFDM symbol in a time domain. The transformed OFDM symbol in a time domain is transferred to the peak power measuring unit 130. According to an exemplary embodiment of the present invention, a process of minimizing a peak to average power ratio (PAPR) is performed after inverse fast Fourier transform, and is processed in a time domain. In addition, the present invention uses a single IFFT process, such that it may be more simply implemented, as compared to a related art method of using a plurality of IFFT processes.

The OFDM symbol transforming unit 120 sequentially transforms the OFDM symbol in a time domain obtained through the inverse fast Fourier transform (IFFT) to generate a plurality of OFDM symbols in various forms and transfers the generated OFDM symbols to the peak power measuring unit 130. Particularly, the OFDM symbol transforming unit 120 may include an OFDM symbol rotating unit 121 rotating the OFDM symbol by a predetermined angle in a complex plane and a cyclic shifting unit 122 performing cyclic shifting for the rotated OFDM symbol, and may repeat a process of rotating the cyclically shifted OFDM symbol by a predetermined angle in the complex plan and performing the cyclic shifting for the rotated OFDM symbol to thereby generate the plurality of OFDM symbols. The predetermined angle may be, for example, 45 degrees.

More specifically, the OFDM symbol transforming unit 120 may include the OFDM symbol rotating unit 121 rotating the OFDM symbol by a predetermined angle in the complex plane and the cyclic shifting unit 122 cyclically shifting any one of components of the rotated OFDM symbol, that is, an in-phase component (I) and a quadrature phase (Q) component by predetermined samples and then recombining the cyclically shifted component to an existing component. According to an exemplary embodiment of the present invention, the OFDM symbol transforming unit 120 may perform the cyclic shifting by cyclically shifting the quadrature phase (Q) component of the rotated OFDM symbol and recombining the cyclically shifted quadrature phase (Q) component with an existing in-phase (I) component. According to another exemplary embodiment of the present invention, the OFDM symbol transforming unit 120 may perform the cyclic shifting by cyclically shifting the in-phase (I) component of the rotated OFDM symbol and recombining the cyclically shifted in-phase (I) component with an existing quadrature phase (Q) component. As described above, according to the present invention, transformed OFDM symbols having various forms with respect to a single OFDM symbol may be generated.

Meanwhile, the peak power measuring unit 130 measures a peak power of an OFDM symbol in a time domain transferred from the inverse fast Fourier transformer 110 and transfers the measured peak power to the OFDM symbol selecting unit 140. In addition, the peak power measuring unit 130 measures the peak powers of the transformed OFDM symbols having various forms transferred from the OFDM symbol transforming unit 120 and transfers the measure peak powers to the OFDM symbol selecting unit 140.

The OFDM symbol selecting unit 140 selects an OFDM symbol having a minimum value among the peak powers of the OFDM symbols transferred from the peak power measuring unit 130 as a candidate OFDM symbol to be transmitted and transmits the selected candidate OFDM symbol as a transmission signal to the outside.

As described above, according to the present invention, the transformed OFDM symbols in various forms are generated with respect to a single OFDM symbol, and the OFDM symbol having a minimum peak power among the generated OFDM symbols is selected and transmitted to secure diversity, whereby the PAPR may be reduced.

Figure 2:
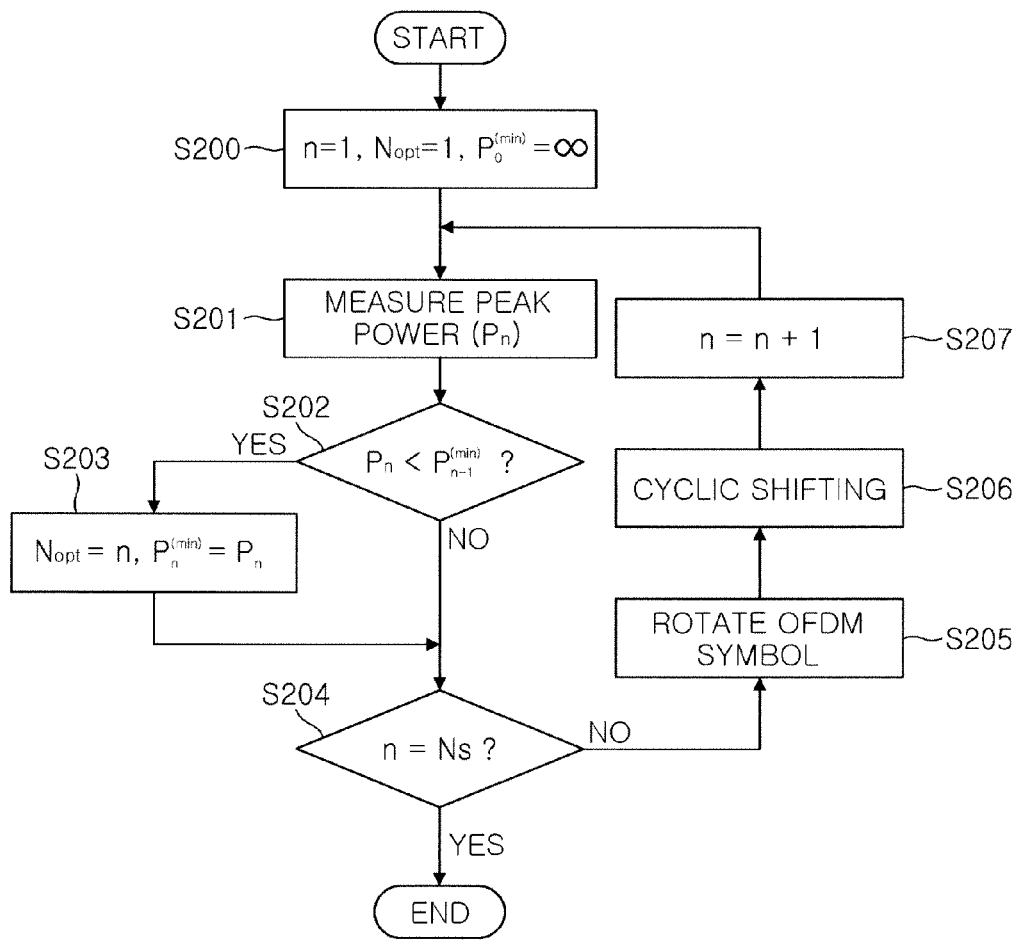
FIG. 2 is a flowchart describing a method for reducing a PAPR through recombination of an OFDM symbol according to an exemplary embodiment of the present invention.

Meanwhile, FIG. 2 is a flowchart describing a method for reducing a PAPR through the recombination of an OFDM symbol according to an exemplary embodiment of the present invention.

Hereinafter, a method for reducing a PAPR through the recombination of an OFDM symbol according to an exemplary embodiment of the present invention will be described in detail with reference to FIGS. 1 and 2.

In operation S200, the initial values of variables are set. A single OFDM symbol $X^{(n)}$ may be represented by the following Equation 1.

$$X^{(n)}=[X^{(n)}_1, X^{(n)}_2, \ldots, X^{(n)}_{LN-1}]=v^{(n)}+ju^{(n)},$$
$$n=1, 2, \ldots N_s \quad \text{[Equation 1]}$$

Here, $X_1, X_2, \ldots, X_{LN-1}$, including subscripts, indicate signal components configuring an OFDM symbol X, L indicates an over-sampling factor, and N indicates any integer. Meanwhile, a superscript (n) indicates the number of a transformed OFDM symbol, and Ns, which is a numeral predetermined by a system designer, indicates the number of various OFDM symbols capable of being transformed with respect to a single OFDM symbol. Meanwhile, $v^{(n)}$ indicates a real number component (that is, an in-phase component) of the OFDM symbol $X^{(n)}$, and $u^{(n)}$ indicates an imaginary number component (that is, a quadrature phase component) of the OFDM symbol $X^{(n)}$. In the above-mentioned operation S200, n is set 1, $N_{opt}$ is set to 1, and $P^{(min)}_0$ is set to ∞. $N_{opt}$ indicates the number of candidate OFDM symbols having a measured minimum peak power of the transformed OFDM symbols, and $1 \leq N_{opt} \leq Ns$.

In operation S201, the peak power measuring unit 130 measures the peak power of the OFDM symbol in a time domain transferred from the inverse fast Fourier transformer 110 according to the following Equation 2. The measured peak power is transferred to the OFDM symbol selecting unit 140.

$$P_n = \max |X^{(n)}| \qquad \text{[Equation 2]}$$

If the peak power $P_n$ of the OFDM symbol transferred from the peak power measuring unit 130 is smaller than a minimum peak power $P^{(min)}_{n-1}$ up to a previous operation in operation S202, the method proceeds to operation S203, and otherwise, it proceeds to operation S204. Here, $P^{(min)}_n$ indicates a minimum peak power among the transformed OFDM symbols up to n-th, and may be represented as follows: $P^{(min)}_n = \min(P_1, P_2, \ldots, P_n)$. Finally, when $n = Ns$, $P^{(min)}_{Ns} = P_{Nopt}$ is satisfied, since $P^{(min)}_0$ is initially set ∞, the method proceeds to operation S203.

In operation S203, the OFDM symbol selecting unit 140 updates the number $N_{opt}$ of the candidate OFDM symbol with the number n of the current OFDM symbol, simultaneously with updating the minimum peak power $P^{(min)}_n$ with the peak power $P_n$ of the current measured OFDM symbol.

In operation S204, the OFDM symbol selecting unit 140 determines whether the number of repetitions is the same as a predetermined number Ns. As a result of the determination, in the case that the number n of repetitions is smaller than the predetermined number Ns, the method proceeds to operation S205.

In operation S205, the OFDM symbol rotating unit 121 rotates the OFDM symbol by a predetermined angle in a complex plane. More specifically, the OFDM symbol rotating unit 121 multiplies the OFDM symbol, which is a signal in a time domain, by $\exp(j\pi/4)$ to thereby rotate the OFDM symbol by 45 degrees in the complex plane. The rotated OFDM symbol is transferred to the cyclic shifting unit 122. An exemplary embodiment of the present invention describes a case in which the OFDM symbol is rotated by 45 degrees; however, the above-mentioned angle is only an example and the OFDM symbol may be rotated by various angles.

In operation S206, the cyclic shifting unit 122 performs cyclic shifting with respect to the rotated OFDM symbol transferred from OFDM symbol rotating unit 121. According to an exemplary embodiment of the present invention, the OFDM symbol transforming unit 120 may perform the cyclic shifting by cyclically shifting the quadrature phase (Q) component of the rotated OFDM symbol by m samples and recombining the cyclically shifted quadrature phase (Q) component with an existing in-phase (I) component. According to another exemplary embodiment of the present invention, the OFDM symbol transforming unit 120 may perform the cyclic shifting by cyclically shifting the in-phase (I) component of the rotated OFDM symbol by m samples and recombining the cyclically shifted in-phase (I) component with an existing quadrature phase (Q) component. The above-mentioned operations S204 and S205 may be represented by the following Equation 3.

$$X^{(n+1)} = QS(m, X^{(n)} \exp(j\theta))$$

That is, Equation 3 means that the transformed OFDM sample $X^{(n+1)}$ may be obtained by rotating a current OFDM sample $X^{(n)}$ by a predetermined angle θ in the complex plane and then performing the cyclic shifting by m samples with respect to any one of the quadrature phase (Q) component or the in-phase (I) component. Meanwhile, m may be represented by $2^{L(n-1)}$, and L is an oversampling factor. An exemplary embodiment of the present invention describes a case in which m is represented by $2^{L(n-1)}$, it is only an example. M may have various movement amounts.

In operation S207, a variable n increases by 1, and the method proceeds to operation S201. The above-mentioned operations S201 through S207 are repetitively performed by Ns.

As described above, according to the present invention, the transformed OFDM symbols in various forms are generated with respect to a single OFDM symbol, and the OFDM symbol having a minimum peak power among the generated OFDM symbols is selected and transmitted to secure diversity, whereby the PAPR may be reduced.

Figure 3:
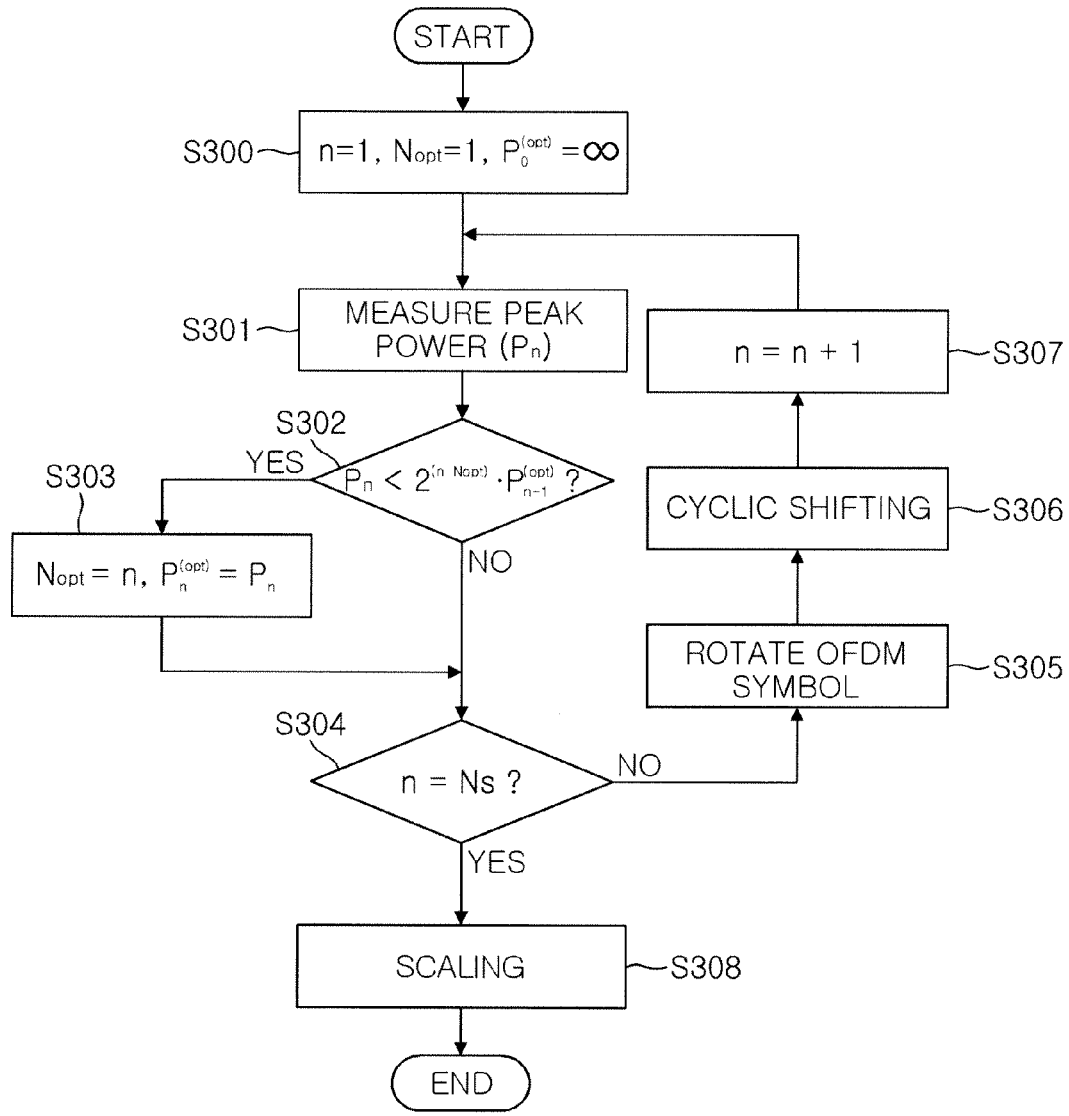
FIG. 3 is a flowchart describing a method for reducing a PAPR through recombination of an OFDM symbol according to another exemplary embodiment of the present invention.

Meanwhile, FIG. 3 is a flowchart describing a method for reducing a PAPR through the recombination of an OFDM symbol according to another exemplary embodiment of the present invention. According to another exemplary embodiment of the present invention shown in FIG. 3, the OFDM symbol rotating unit 140 of FIG. 3 does not apply a scaling factor in order to reduce a burden of a complex operation due to a rotation of 45 degrees in the complex plane. That is, the symbol may be rotated by performing two additional operations (a subtraction operation pertains to the same category as that of the addition operation) instead of a complex multiplication operation, and operations S302 and S308 are modified or added in order to solve problems due to a fact that the scaling factor is not applied. Other operations are described in detail in FIG. 2, and a detailed description of overlapping portions will be omitted.

In operation S300, the initial values of variables are first set. The initial value is set as follows: $n=1$, $N_{opt}=1$, $P^{(opt)}_0 = \infty$.

In operation S301, the peak power measuring unit 130 measures the peak power of the OFDM symbol in a time domain transferred from the inverse fast Fourier transformer 110. The measured peak power is transferred to the OFDM symbol selecting unit 140.

If the peak power $P_n$ of the OFDM symbol transferred from the peak power measuring unit 130 is smaller than a minimum peak power $2^{(n-Nopt)} \times P^{(opt)}_{n-1}$ up to a previous operation in operation S302, the method proceeds to operation S303, and otherwise, proceeds to operation S304. Since $P^{(opt)}_0$ is initially set as ∞, the method proceeds to operation S303. Since the OFDM symbol transforming unit 120 does not apply a scaling factor as $$\frac{1}{\sqrt{2}}$$

described below, the peak power of the OFDM symbol is always reduced. Therefore, in order to compensate for the reduced peak power, the minimum peak power $P^{(opt)}_{n-1}$, which is an object to be compared with the measured peak power $P_n$ of a current OFDM symbol, is multiplied by $2^{(n-Nopt)}$.

Here, $P^{(opt)}_n$ may be represented by the following Equation 4.

$$P^{(opt)}_n = \min(2^{n-1} P_1, 2^{n-2} P_2, \ldots, 2^0 P_2)/2^{n-Nopt} \qquad \text{[Equation 4]}$$

That is, operation S202 of FIG. 2 is replaced by operation S302 of FIG. 3, and $P^{(opt)}_n$ also indicates a minimum peak power among n transformed OFDM symbols.

In operation S303, the OFDM symbol selecting unit 140 updates the number $N_{opt}$ of the candidate OFDM symbol with the number n of the current OFDM symbol, simultaneously with updating the minimum peak power $P^{(opt)}_n$ with the peak power $P_n$ of the current measured OFDM symbol.

In operation S304, the OFDM symbol selecting unit 140 determines whether the number of repetitions is the same as a predetermined number Ns. As a result of the determination, since the number n of repetition is smaller than the predetermined number Ns, the method proceeds to operation S305.

In operation S305, the OFDM symbol rotating unit 121 rotates the OFDM symbol by a predetermined angle in a complex plane. An expression equation after the OFDM symbol is rotated by 45 degrees in the complex plane using the real number component v(n) and the imaginary number component u(n) of Equation 1 requires a complex multiplication operation as in the following Equation 5.

$$X^{(n+1)} = QS(m, X^{(n)} \times \exp(j\pi/4)) = \quad \text{[Equation 5]}$$
$$QS\left(m, \frac{1}{\sqrt{2}}\{(v^{(n)} - u^{(n)}) + j(v^{(n)} + u^{(n)})\}\right)$$

Therefore, according to another exemplary embodiment of the present invention, the scaling factor $$\frac{1}{\sqrt{2}}$$

is not applied at the time of rotation of the OFDM symbol, such that the symbol is rotated only by two addition operations (a subtraction operation is included in the addition operation) of $(v^{(n)} - u^{(n)})$ and $(v^{(n)} - u^{(n)})$ instead of the complex multiplication operation, whereby a calculation amount may be reduced. However, in this case, operations S301 through S307 are repetitively performed, which causes an increase in the power of the OFDM symbol. In order to compensate for this disadvantage, operations S302 and S306 may be added.

In operation S306, the cyclic shifting unit 122 performs cyclic shifting with respect to the rotated OFDM symbol transferred from OFDM symbol rotating unit 121.

In operation S307, a variable n increases by 1, and the method proceeds to operation S301. The above-mentioned operations S301 through S307 are repetitively performed by Ns.

Finally, when a procedure by a predetermined repetition number Ns ends, the OFDM symbol selecting unit 140 downscales and outputs the candidate OFDM symbol to be transmitted to the outside by $$\left(\frac{1}{\sqrt{2}}\right) \times N_{opt}$$

in operation S308.

Table 1 below is a table in which complexities between the related art and an exemplary embodiment of the present invention are compared with each other.

TABLE 1

| | PTS | Iterative-PTS | Present Invention |
|---|---|---|---|
| OFDM Symbol Search Number(Ns) | Ns = $2^{M-1}$ | Ns = M + 1 | Ns = 2M − 1 |
| IFFT Operation Number | M | M | 1 |
| Complex Addition Operation Number | N(M − 1) + N(Ns − 1) | N(M − 1) + N(Ns − 1) | N(Ns − 1) |
| Sub-information Bit Trnasfer Amount | $\log_2$Ns | Ns − 1 | $\log_2$Ns |

In the table, the OFDM symbol search number Ns, the IFFT operation number, the complex addition operation number, and the sub-information bit transfer amount are compared. Here, since the complex addition operation is the same as two addition operations (including a subtraction operation), the complex addition operation number was compared based on this fact. It may be appreciated from Table 1 that the complexity of an exemplary embodiment of the present invention is significantly reduced, as compared to the related art (Partial Taransmit Sequence (PTS) and Iterative-PTS).

As described above, according to the exemplary embodiments of the present invention, the transformed OFDM symbols in various forms are generated with respect to a single OFDM symbol, and the OFDM symbol having a minimum peak power among the generated OFDM symbols is selected and transmitted to secure diversity, whereby the PAPR may be reduced. In addition, the present invention uses an IFFT process once such as a general OFDM transmission, such that it may be more simply implemented, as compared to a related art method using a plurality of IFFT processes.

While the present invention has been described in connection with the exemplary embodiments, modifications and variations can be made thereto without departing from the scope of the present invention. Therefore, the scope of the present invention should be not be construed as being limited to the exemplary embodiments but should be defined by the appended claims and their equivalents.

What is claimed is:

1. An apparatus for reducing a peak to average power ratio (PAPR), the apparatus comprising:
   an orthogonal frequency division multiplexing (OFDM) symbol transforming unit sequentially transforming an OFDM symbol in a time domain obtained through an inverse fast Fourier transform (IFFT) to generate a plurality of OFDM symbols;
   a peak power measuring unit measuring peak powers of each of the OFDM symbol and the plurality of OFDM symbols generated therefrom; and
   an OFDM symbol selecting unit selecting an OFDM symbol having a minimum value among the measured peak powers as a candidate OFDM symbol to be transmitted and transmitting the selected candidate OFDM symbol,
   wherein the OFDM symbol transforming unit generates the plurality of OFDM symbols by (a) performing a process of rotating the OFDM symbol by a predetermined angle in a complex plane and performing cyclical shifting with respect to the rotated OFDM symbol and (b) repetitively performing process (a) with respect to the cyclically shifted OFDM symbol, and
   wherein the OFDM symbol transforming unit performs the cyclic shifting by cyclically shifting a quadrature phase (Q) component of the rotated OFDM symbol and recombining the cyclically shifted quadrature phase (Q) component with an existing in-phase (I) component.

2. The apparatus of claim 1, wherein the predetermined angle is 45 degrees.

3. The apparatus of claim 2, wherein the OFDM symbol transforming unit uses only an addition operation and a subtraction operation of the in-phase (I) component and the quadrature phase (Q) component of the OFDM symbol in calculating a result by the rotation of the OFDM symbol.

4. An apparatus for reducing a peak to average power ratio (PAPR), the apparatus comprising:
   an orthogonal frequency division multiplexing (OFDM) symbol transforming unit sequentially transforming an OFDM symbol in a time domain obtained through an inverse fast Fourier transform (IFFT) to generate a plurality of OFDM symbols;
   a peak power measuring unit measuring peak powers of each of the OFDM symbol and the plurality of OFDM symbols generated therefrom; and
   an OFDM symbol selecting unit selecting an OFDM symbol having a minimum value among the measured peak powers as a candidate OFDM symbol to be transmitted and transmitting the selected candidate OFDM symbol,
   wherein the OFDM symbol transforming unit generates the plurality of OFDM symbols by (a) performing a process of rotating the OFDM symbol by a predetermined angle in a complex plane and performing cyclical shifting with respect to the rotated OFDM symbol and (b) repetitively performing process (a) with respect to the cyclically shifted OFDM symbol, and
   wherein the OFDM symbol transforming unit performs the cyclic shifting by cyclically shifting an in-phase phase (I) component of the rotated OFDM symbol and recombining the cyclically shifted in-phase (I) component with an existing quadrature phase (Q) component.

5. A method for reducing a peak to average power ratio (PAPR), the method comprising:
   (a) sequentially transforming an OFDM symbol in a time domain obtained through an inverse fast Fourier transform (IFFT) to generate a plurality of OFDM symbols;
   (b) measuring peak powers of each of the OFDM symbol and the plurality of OFDM symbols generated therefrom; and
   (c) selecting an OFDM symbol having a minimum value among the measured peak powers as a candidate OFDM symbol to be transmitted and transmitting the selected candidate OFDM symbol,
   wherein in step (a), the plurality of OFDM symbols are generated by (a1) performing a process of rotating the OFDM symbol by a predetermined angle in a complex plane and performing cyclical shifting with respect to the rotated OFDM symbol; and (a2) repetitively performing step (a1) with respect to the cyclically shifted OFDM symbol, and
   wherein in step (a),the cyclic shifting is performed by cyclically shifting a quadrature phase (Q) component of the rotated OFDM symbol and recombining the cyclically shifted quadrature phase (Q)component with an existing in-phase (I) component.

6. The method of claim 5, wherein in step (a), the predetermined angle is 45 degrees.

7. The method of claim 6, wherein in step (a), only an addition operation and a subtraction operation of the in-phase (I) component and the quadrature phas (Q) component of the OFDM symbol are used in calculating a result by the rotation of the OFDM symbol.

8. A method for reducing a peak to average power ratio (PAPR), the method comprising:
   (a) sequentially transforming an OFDM symbol in a time domain obtained through an inverse fast Fourier transform (IFFT) to generate a plurality of OFDM symbols;
   (b) measuring peak powers of each of the OFDM symbol and the plurality of OFDM symbols generated therefrom: and
   (c) selecting an OFDM symbol having a minimum value among the measured peak powers as a candidate OFDM symbol to be transmitted and transmitting the selected candidate OFDM symbol, and
   wherein in step (a), the plurality of OFDM symbols are generated by (a1) performing a process of rotating the OFDM symbol by a predetermined angle in a complex plane and performing cyclical shifting with respect to the rotated OFDM symbol; and (a2) repetitively performing step (a1) with respect to the cyclically shifted OFDM symbol,
   wherein in step (a), the cyclic shifting is performed by cyclically shifting an in-phase phase (I) component of the rotated OFDM symbol and recombining the cyclically shifted in-phase (I) component with an existing quadrature phase (Q) component.

* * * * *